H. L. WITTSTEIN.
GATE VALVE.
APPLICATION FILED JULY 28, 1919.
1,340,591.
Patented May 18, 1920.
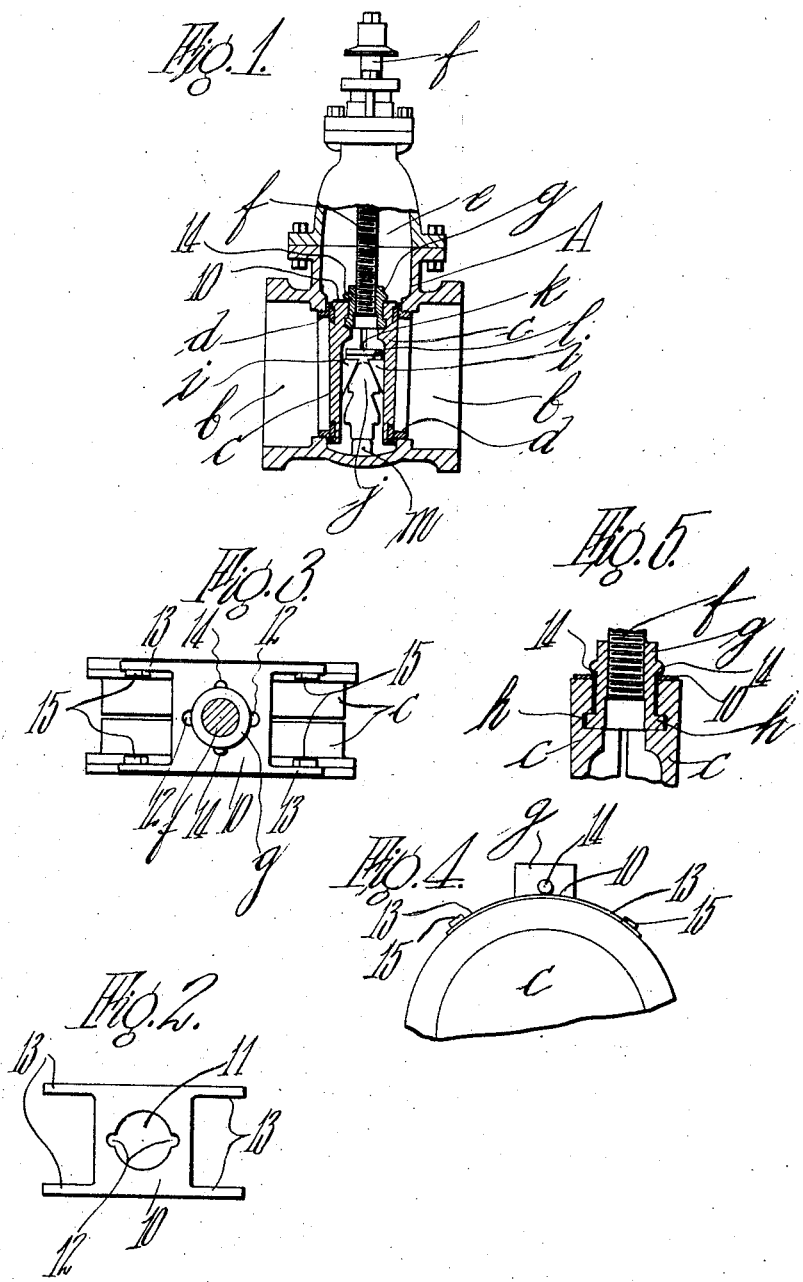
INVENTOR
Herman L. Wittstein
BY Chapin + Neal
ATTORNEYS.

UNITED STATES PATENT OFFICE.

HERMAN L. WITTSTEIN, OF SPRINGFIELD, MASSACHUSETTS, ASSIGNOR TO CHAPMAN VALVE MANUFACTURING COMPANY, OF INDIAN ORCHARD, MASSACHUSETTS, A CORPORATION OF MASSACHUSETTS.

GATE-VALVE.

1,340,591.          Specification of Letters Patent.      Patented May 18, 1920.

Application filed July 28, 1919. Serial No. 313,806.

*To all whom it may concern:*

Be it known that I, HERMAN L. WITTSTEIN, a citizen of the United States of America, residing at Springfield, in the county of Hampden and State of Massachusetts, have invented certain new and useful Improvements in Gate-Valves, of which the following is a specification.

This invention relates to improvements in gate valves and, more particularly, to such valves having double gates which, when lowered, are spread apart with a wedging action to tightly force them against their respective seats.

In such valves, the gates must needs be loosely connected with the screw, by means of which they are raised and lowered, in order to permit their separation by the wedging action described. This wedging action is obtained by at least one centrally arranged wedge, which loosely hooks onto the gates so as to be raised and lowered therewith and which when lowered is arrested by an abutment in the valve casing prior to the completion of the lowering movement of the gates, whereby a relative movement is obtained between the gates and wedge to separate the gates.

Since the gates are, and must of necessity, be loosely connected to the screw and to the wedge, it is essential to provide some means to hold them against undue longitudinal separation, such as would cause dissociation of them from the parts to which they are loosely connected. Many devices for accomplishing this general function have been provided heretofore, but, so far as I am aware, such devices are relatively expensive and not particularly adapted for low cost production. For example, pairs of substantially elliptical links have been used, each of which is connected to the gate by screws or bolts threaded into the gates. Accepted practice makes necessary at least two links and four screws, making six parts to manufacture, aside from the machining operations of drilling and tapping four holes in the gates. Manufacturers desire to reduce the amount of machine work on the valve to a minimum and to this end, many parts, as the gates, wedges, casing and so forth are formed by castings, and on the castings but few machining operations are required.

This invention has for its object to provide improved means for connecting the gates to prevent their longitudinal separation beyond predetermined limits.

More particularly, the invention seeks to provide connecting means of the character mentioned, which are particularly adapted for quantity production at low cost and are characterized by the elimination of the machining operations above-mentioned.

Other objects and advantages will appear in the following description and in the illustrative embodiment of the invention in the accompanying drawings, in which—

Figure 1 is a sectional elevational view of a gate valve embodying the invention;

Fig. 2 is a plan view of the improved connector for the gates of the valve;

Fig. 3 is a plan view of the gates with the connector in place thereon;

Fig. 4 is a fragmentary elevational view of the gates and connector; and

Fig. 5 is a cross-sectional view thereof.

Referring to these drawings, there has been shown, in Fig. 1, a well-known type of gate valve, as an illustrative example of one type of valve, in which the invention may be embodied. The invention may equally well be embodied in various other types of gate valves and is therefore independent of the particular type of valve employed.

The gate valve, shown in Fig. 1, will be described insofar as is necessary for a full understanding of the invention. A represents the casing of the valve which is formed with longitudinal passages $b$, which may be closed off from communication with one another by two gates $c$, centrally located in the casing and coöperating with valve seats $d$ therein. The casing A also affords a lateral passage $e$ leading centrally from the passages $b$ and at right angles thereto. Into passage $e$ the gates $b$ may be drawn by means of a threaded spindle $f$, which is rotatably mounted in the upper end of the casing and may be turned from without the casing in the usual manner. Threaded onto the lower end of spindle $f$ is a nut $g$ which is provided with opposed flanges $h$ to engage in recesses provided in gates c, as shown in Fig. 5. On the adjacent faces of gates c are opposed wedge-shaped lugs i which coöperate with a centrally arranged wedge j to longitudinally separate gates c and force them against seats d. The wedge j has a hook k which overlies the horizontal surfaces l of lugs i, whereby, when gates c are moved laterally outward by rotation of spindle f, the lugs i will engage and lift wedge j. An abutment m, on casing A, arrests the wedge j, as it is subsequently moved laterally inwardly with gates c, and continued movement of the gates after the wedge j has come to rest will cause the longitudinal separation of the gates.

The foregoing structure is typical of the usual gate valve and it is to be noted that the nut g and wedge j are merely loosely connected with the separable gates c. Both wedge j and nut g must, of necessity, so engage the gates c as to permit their separation, but the gates c must necessarily be held together and limited in their degree of longitudinal separation or else the nut g and wedge j might conceivably become disconnected therefrom, during the lifting or lowering of the gates or during the time when the gates c are in raised position in the passage e.

The improved means for connecting the gates c and preventing their lateral separation beyond a predetermined degree will now be described. Such means includes a connector 10 (Fig. 2) which may advantageously be formed as a punching from sheet metal. Connector 10 is provided with a central hole 11 to slip over the upper end of nut g and with two diametrically opposed recesses 12 in the circumference of hole 11. The connector 10 is provided on each side with a pair of spaced parallel fingers 13 and the latter, as well as the body of the connector, is preferably curved to conform to the curvature of gates c, as shown in Fig. 4. On the hub of nut g, two opposed lugs 14 are cast in such position that the connector 10, when turned at right angles from the position shown in Fig. 3, will slip past these lugs by reason of the recesses 12. When, however, the connector 10 is turned into the illustrated position, the lugs 14 overlie unrecessed parts of the connector 10 and prevent it from any material vertical movement relatively to nut g or the gates c carried thereby. Each gate c has cast upon its periphery two radially projecting lugs 15, which are so angularly spaced thereon as to lie one on each side of the nut g. Each pair of fingers 13 are adapted to receive between them the lug 15 of one gate c and the opposite lug 15 on the other gate c. The lugs 15, by abutment with the fingers 13, limit the extent of longitudinal movement of gates c.

The gates are held from spreading beyond the desired limits at their lower ends by the valve seats d for the lower ends of the gates never rise beyond the upper limits of seats d.

The operation of the valve is as usual and it only remains to describe the manner of assembling the connector, gates and so forth. The connector 10 is first slipped over the lugs 14 on nut g and then given a quarter turn, whereby it is held from upward displacement by lugs 14. The flanges h prevent the connector from falling downwardly off the nut. Then with the spindle and assembled nut held horizontally, one gate c is applied thereto. To do this, the gate is tilted to a slight angle with relation to the spindle so that the gate may freely pass flange h. Then the lugs 15 may be slipped in back of fingers 13 and the gate then brought into substantial parallelism with the spindle to engage the flange h in the recess in the gate. With these parts assembled, the one gate is laid face downward on the bench and wedge J applied thereto. Then the other gate c is tilted and slipped in place as just described.

The connecting means described is characterized by simplicity and low cost of manufacture. The connector itself is merely a sheet metal stamping and may therefore be produced in quantities at relatively low cost. It may be formed at a single operation and requires no subsequent machining operations. The remaining elements of the connecting means, being the cast lugs 14 and 15, require merely a slight addition to the patterns from which the gates and nut are cast and, once such changes are made, there is no additional expense by reason of their provision. The connecting means is also adapted for rapid and convenient assembly inasmuch as it requires no bolts, screws, or the like, for its application.

The invention has been disclosed herein, in an embodiment at present preferred, for illustrative purposes, but the scope of the invention is defined by the appended claims rather than by the foregoing description.

What I claim is:—

1. The combination in a gate valve, having laterally and longitudinally movable gates, means to move them laterally, and means to separate them longitudinally during their movement laterally inward, of an integral projection on each gate, and a member bridging across the gates and having two spaced shoulders so disposed as to engage said projections to limit the longitudinal separation of the gates and yet permit movement of the latter toward one another.

2. The combination in a gate valve, having laterally and longitudinally movable gates, means to move them laterally, and means to separate them longitudinally during their movement laterally inward, of two spaced projections provided on each gate, and a member bridging across the gates and having two pairs of spaced shoulders so disposed as to engage said projections to limit the longitudinal separation of the gates and yet permit movement of the latter toward one another.

3. The combination in a gate valve, having laterally and longitudinally movable gates, means to move them laterally, and means to separate them longitudinally during their movement laterally inward, of two spaced projections provided on each gate, and an H-shaped member affording two pairs of spaced fingers so disposed as to engage said projections to limit the longitudinal separation of the gates and yet permit movement of the latter toward one another.

4. The combination in a gate valve, with the laterally and longitudinally movable gates, a spindle by means of which the gates are moved laterally, and means to separate the gates longitudinally during their movement laterally inward, of an H-shaped member loosely encircling the spindle and affording two pairs of spaced fingers, one finger of each pair overlying one gate and the other finger of each pair overlying the other gate, and a radial projection provided on each gate to engage each of the overlying fingers and limit the separation of said gates, said member and fingers leaving the gates free for movement toward one another at all times.

5. In a gate valve, two laterally movable and longitudinally separable gates, a rotatable threaded spindle, a nut thereon with which each gate is loosely engaged, an H-shaped member carried by said nut with two of its projecting fingers overlying one gate, its other two fingers overlying the other gate, and a radial projection provided on each gate adapted to abut each of the overlying fingers when the gates are separated and limit the degree of their separation.

6. In a gate valve, two laterally movable and longitudinally separable gates, a rotatable threaded spindle, a nut thereon with which each gate is loosely engaged, an H-shaped member removably secured to said nut with two of its projecting fingers overlying one gate and its other two fingers overlying the other gate, and a radial projection provided on each gate adapted to abut each of the overlying fingers when the gates are separated and limit the degree of their separation.

7. In a gate valve, two laterally movable and longitudinally separable gates, a rotatable threaded spindle, a nut thereon with which each gate is loosely engaged, lugs provided on the periphery of said nut, a member having a central opening to receive said nut and recesses through which said lugs may be passed, pairs of fingers extending from opposite sides of said member, said member being movable around the nut to bring the recesses and lugs out of line, and to cause two oppositely extending fingers to overlie each gate, and a radial projection provided on each gate to engage each of the overlying fingers and limit the separation of said gates.

HERMAN L. WITTSTEIN.